(12) United States Patent
Nishio et al.

(10) Patent No.: US 8,342,202 B2
(45) Date of Patent: Jan. 1, 2013

(54) PIPE COUPLING MEMBER FOR HIGH-PRESSURE FLUID

(75) Inventors: Takuya Nishio, Tokyo (JP); Kunihiko Goto, Tokyo (JP); Kazunori Aoki, Tokyo (JP); Osamu Yamamoto, Toyota (JP); Kazuyoshi Tashiro, Toyota (JP); Goro Suzuki, Toyota (JP); Shinichi Nomura, Toyota (JP); Kosei Yoshida, Toyota (JP)

(73) Assignees: Nitto Kohki Co., Ltd., Tokyo (JP); Toyota Jidosha Kabushiki Kaisha, Aichi-ken (JP)

( * ) Notice: Subject to any disclaimer, the term of this patent is extended or adjusted under 35 U.S.C. 154(b) by 650 days.

(21) Appl. No.: 12/532,565

(22) PCT Filed: Mar. 19, 2008

(86) PCT No.: PCT/JP2008/055074
§ 371 (c)(1),
(2), (4) Date: Dec. 16, 2009

(87) PCT Pub. No.: WO2008/114816
PCT Pub. Date: Sep. 25, 2008

(65) Prior Publication Data
US 2010/0108162 A1    May 6, 2010

(30) Foreign Application Priority Data

Mar. 22, 2007 (JP) ................................ 2007-075506

(51) Int. Cl.
*F16K 1/42* (2006.01)
(52) U.S. Cl. .......................... 137/515; 251/363; 277/926
(58) Field of Classification Search .................. 137/515, 137/515.5, 454.2, 315.27; 251/359, 361, 251/362, 363, 175; 277/926
See application file for complete search history.

(56) References Cited

U.S. PATENT DOCUMENTS

| 4,378,028 A | 3/1983 | Weber et al. |
| 4,828,296 A | 5/1989 | Medvick |

(Continued)

FOREIGN PATENT DOCUMENTS

DE    32 11 937    11/1982

(Continued)

OTHER PUBLICATIONS

International Search Report issued May 20, 2008 in International (PCT) Application No. PCT/JP2008/055074.

*Primary Examiner* — Kevin Lee
*Assistant Examiner* — Macade Brown
(74) *Attorney, Agent, or Firm* — Wenderoth, Lind & Ponack, L.L.P.

(57) ABSTRACT

A pipe coupling member for high-pressure fluid such as liquefied hydrogen includes a seal ring having a highly effective sealing function to prevent leakage of the fluid. The seal ring (72) is set in a seal ring setting space (39) defined by a second radial surface (36) and a seal ring setting surface (38) of a first tubular member (20), a forward end surface of a second tubular member (22), and the outer peripheral surface of a valve seat member (24). A forward end portion of the second tubular member (22) is provided with a communication hole (84) radially penetrating the forward end portion. The pressure of the high-pressure fluid on the downstream side of a valve seat surface (52) causes a fluid path in the second tubular member to be communicated with the sealing ring setting space (39) via the communication hole (84) and via a gap between the seal ring setting surface (38) and the outer peripheral surface of the forward end portion of the second tubular member.

9 Claims, 1 Drawing Sheet

U.S. PATENT DOCUMENTS

| | | | |
|---|---|---|---|
| 6,024,124 A | 2/2000 | Braun et al. | |
| 6,082,401 A | 7/2000 | Braun et al. | |
| 6,161,578 A | 12/2000 | Braun et al. | |
| 7,389,791 B2 * | 6/2008 | Fangmeier | 137/493.9 |
| 2004/0189005 A1 | 9/2004 | Mikiya et al. | |

FOREIGN PATENT DOCUMENTS

| | | |
|---|---|---|
| DE | 196 81 170 | 12/1997 |
| DE | 10 2004 014 461 | 11/2004 |
| EP | 0 278 687 | 8/1988 |
| FR | 2 503 828 | 10/1982 |
| GB | 2 096 723 | 10/1982 |
| JP | 57-171188 | 10/1982 |
| JP | 63-270992 | 11/1988 |
| JP | 11-500517 | 1/1999 |
| JP | 2004-293568 | 10/2004 |
| WO | 96/21120 | 7/1996 |

* cited by examiner

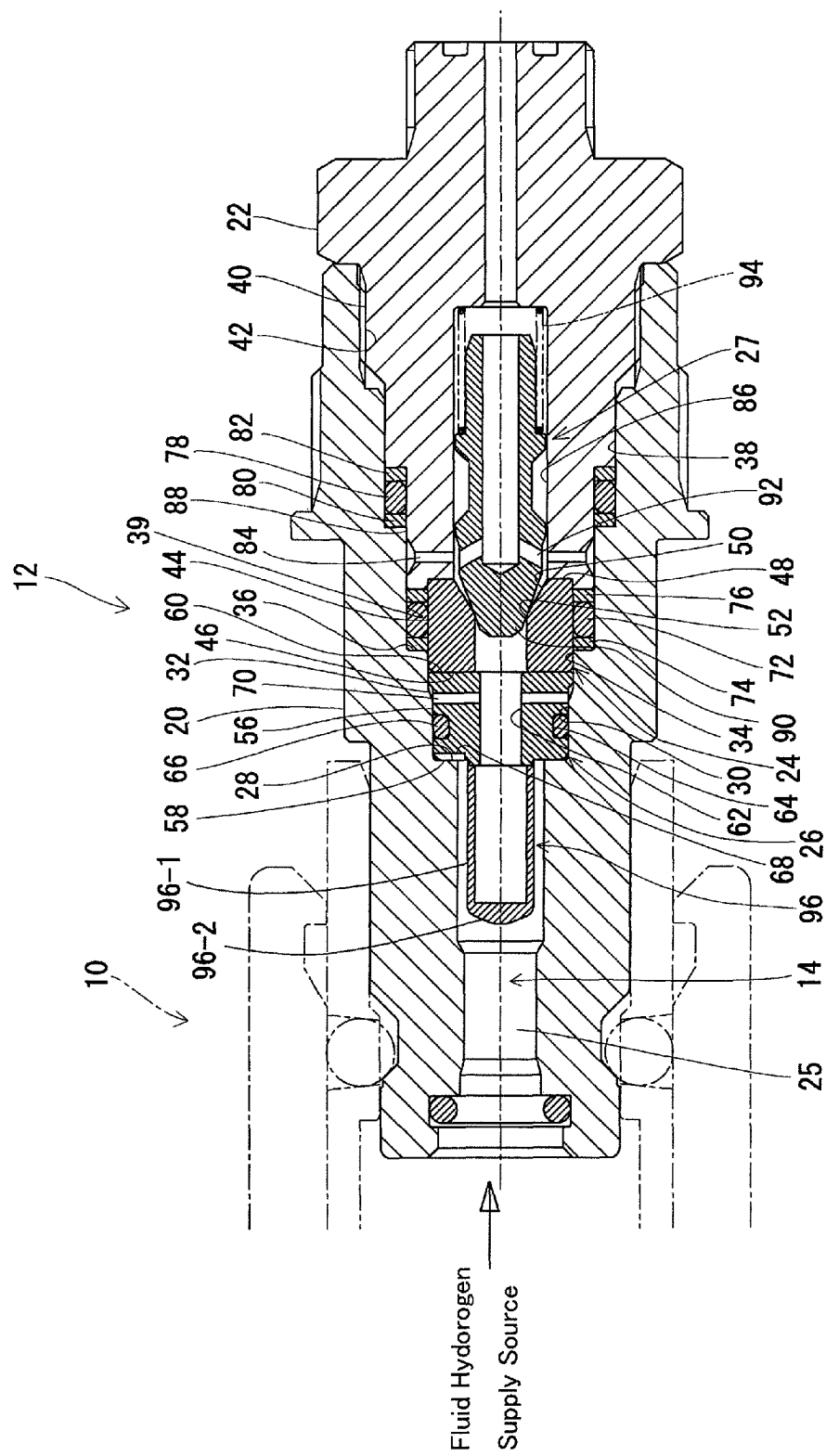

PIPE COUPLING MEMBER FOR HIGH-PRESSURE FLUID

TECHNICAL FIELD

The present invention relates to a pipe coupling member suitable for handling super-high pressure fluid as high as 70 Mpa, such as hydrogen gas.

BACKGROUND ART

In recent years, vehicles in which fuel cells using hydrogen gas are employed as a source of power have been put in practical use. In this type of vehicle, the hydrogen gas must be supplied at a hydrogen gas supply station or the like, which is similar to a filling station for regular gasoline vehicles. In this case, the hydrogen gas is supplied by connecting a pipe coupling member attached to an outlet of a hose for discharging and supplying hydrogen gas from a hydrogen gas storage tank provided on the supply station side to a pipe coupling member attached to an inlet of a hydrogen gas storage tank on the vehicle side (Japanese Unexamined Patent Application No. 2004-293568).

DISCLOSURE OF THE INVENTION

Problem to be Solved by the Invention

In this case, the hydrogen gas is pressurized to at least 30 Mpa or higher, and typically to approximately 70 Mpa. Therefore, the pipe coupling that is employed as the hydrogen gas supply means must be perfectly secure to prevent leakage of the hydrogen gas. An opening-closing valve must be mounted in the interior of each pipe coupling member, and therefore, in a typical constitution, tubular pipe coupling members are aligned in an axial direction and connectively fitted to each other. A seal ring is set to ensure that the hydrogen gas does not leak to the outside through a gap between fitting surfaces of the tubular members that are fitted to each other or from a tubular member forward end portion upon completion of the hydrogen gas supply. However, since the hydrogen gas is in a state of extremely high pressure, great care must be taken when setting the seal ring.

The present invention has been designed in consideration of this point, and an object thereof is to provide a pipe coupling member for high-pressure fluid in which a seal ring of a pipe coupling member for handling high-pressure fluid such as hydrogen gas functions perfectly to ensure that the high-pressure fluid does not leak.

Means for Solving the Problem

More specifically, the present invention provides a pipe coupling member for high-pressure fluid, including:

a tubular high-pressure fluid pipe coupling body having a fluid passage that extends from an inlet side for receiving a high-pressure fluid to an outlet side connected to a high-pressure fluid tank, and a valve seat provided on a wall surface of the fluid passage so as to surround the fluid passage; and a valve member that is set in the fluid passage and engaged with/disengaged from the valve seat in order to open and close the fluid passage, wherein the high-pressure fluid pipe coupling body includes a first tubular member extending from the inlet side toward the outlet side and a second tubular member that is inserted into and fixed to the first tubular member from the outlet side of the first tubular member, an inner peripheral surface of the first tubular member includes a fluid passage defining surface that extends from the inlet side toward the outlet side so as to define an upstream part of the fluid passage, a first radial surface that extends radially outward from a outlet side edge of the fluid passage defining surface, a valve seat setting surface, which is located closer to the outlet side than the first radial surface, has a larger diameter than an outer peripheral edge of the first radial surface and extends parallel to an axis of the fluid passage, a second radial surface that extends radially outward from an outlet side edge of the valve seat setting surface, and a seal ring setting surface that extends parallel to the axis of the fluid passage from an outer peripheral edge of the second radial surface, the pipe coupling member for high-pressure fluid further comprises a valve seat member including a tubular outer peripheral surface constituted by an upstream side part that is engaged with the valve seat setting surface and a downstream side part that extends parallel to the seal ring setting surface, an annular inlet side end surface that extends radially inward from an inlet side edge of the outer peripheral surface, an annular outlet side end surface that extends radially inward from an outlet side edge of the outer peripheral surface, and an inner peripheral surface that extends between the inlet side end surface and the outlet side end surface, the second tubular member includes a forward end part having an outer peripheral surface that is inserted into the first tubular member so as to contact the seal ring setting surface thereof, wherein a forward end surface of the forward end part abuts against the outlet side end surface of the valve seat member such that the valve seat member is held between the forward end surface of the forward end part and the first radial surface of the first tubular member, a tubular seal ring setting space is formed by the forward end surface of the second tubular member, the seal ring setting surface, the second radial surface, and the outer peripheral surface of the valve seat member, and a seal ring is set in the seal ring setting space so as to be hermetically engaged to the outer peripheral surface of the valve seat member and the seal ring setting surface, the valve member is engaged with the valve seat member to close the fluid passage, and the forward end part of the second tubular member includes a communication hole that penetrates the forward end part radially from an inner peripheral surface of the second tubular member, which defines a downstream part of the fluid passage, to the outer peripheral surface of the forward end part, which contacts the seal ring setting surface of the first tubular member.

A particular feature of this pipe coupling member for high-pressure fluid is that the communication hole penetrating the forward end part of the second tubular member is provided as described above.

More specifically, the inventor of the present application prepared a pipe coupling member for high-pressure fluid having an identical constitution to that described above but lacking the above-described communication hole, and performed a hydrogen gas supply experiment. After supplying the hydrogen gas, the valve member provided in the pipe coupling member for high-pressure fluid was closed and a pipe coupling member on a hydrogen gas supply side was detached from the pipe coupling member for high-pressure fluid. It was learned that even though the seal ring was set in the manner described above, hydrogen gas sealed on the downstream side of the valve member leaked to the upstream side of the pipe coupling member for high-pressure fluid through the part in which the seal ring was set.

After performing various investigations, the inventor of the present application inferred the following in relation to this point. When the hydrogen gas supply side and reception side pipe coupling members are connected to each other and hydrogen gas is supplied, the valve member in the reception side pipe coupling member is closed in the moment just before the start of the supply, and therefore the pressure of the hydrogen gas on the upstream side of the valve member acts on the seal ring through a minute gap formed between constitutional elements of the reception side pipe coupling member, whereas pressure does not act on the seal ring from the downstream side of the valve member. Therefore, the seal ring is forced toward the outlet side of the pipe coupling member by the extremely high pressure of the hydrogen gas in the seal ring setting space in which the seal ring is set. As a result, the seal ring is partially pressed into and sandwiched within a gap (this gap extends to the outer peripheral surface of the pipe coupling member) between an inner peripheral surface of the first tubular member (more specifically, the seal ring setting surface), which defines an outlet side wall surface of the seal ring setting space, and an outer peripheral surface of the forward end part of the second tubular member. Hence, even when the valve member is subsequently opened such that the pressure of the hydrogen gas is applied through a minute gap extending into the seal ring setting space from the downstream side of the valve member, the seal ring partially pressed into the aforementioned gap remains as it is. Therefore, when the valve member is closed following completion of the hydrogen gas supply operation, the hydrogen gas that is trapped on the downstream side of the valve member reaches the seal ring setting space through the aforementioned minute gap. However the seal ring is not fully functional therefore the hydrogen gas passes the seal ring and leaks to the upstream side.

On the basis of this inference, the inventor of the present application succeeded in preventing this hydrogen gas leakage by providing a communication hole in the forward end part of the second tubular member in the manner described above. The reason for this success is believed to be that the pressure of the hydrogen gas, which is transmitted through this specially provided communication hole without any particular flow passage resistance, acts on the seal ring in the imperfect state described above through a gap between the inner peripheral surface of the first tubular member and the outer peripheral surface of the forward end part of the second tubular member, thereby returning the seal ring to its original perfect state.

In the pipe coupling member described above, it is preferable that backup rings set on the inlet side and the outlet side of the seal ring in the seal ring setting space and set between the outer peripheral surface of the valve seat member and the seal ring setting surface are provided.

The inlet side backup ring is used to prevent damage to the seal ring caused by the seal ring being forced into a gap between the valve seat member setting surface of the first tubular member and the outer peripheral surface of the valve seat member when the supplied high-pressure fluid forces the seal ring toward the inlet side of the pipe coupling member for high-pressure fluid. The outlet side backup ring is used to prevent damage to the seal ring caused by the seal ring being pulled toward the tank side and suctioned into a gap between the outer peripheral surface of the valve member and the second tubular member when a tank connected to the outlet side of the pipe coupling member is decompressed for maintenance. Note that the inventor of the present application has confirmed that the hydrogen gas leakage that can be prevented by providing the communication hole in the forward end of the second tubular member as described above cannot be sufficiently prevented simply by setting the two backup rings.

More specifically, a tubular fixing member is set between the valve seat member and the first radial surface such that the valve seat member abuts against the first radial surface through the fixing member and abuts against the forward end surface of the second tubular member.

In this case, it is preferable that an outlet side end surface of the fixing member, which contacts the valve seat member, extends from a position contacting the valve seat member setting surface and abutting against an outer peripheral edge of the inlet side end surface of the valve seat member to a radial inner side position beyond an inner peripheral edge of the inlet side end surface, thereby abutting against the entirety of the inlet side end surface of the valve seat member.

By supporting the entire inlet side end surface of the valve seat member, damage to the valve seat member can be reduced.

More specifically, the first radial surface may have a smaller diameter than the valve the valve seat setting surface and a fixing member setting surface into which the fixing member is fitted and which extends parallel to the axial direction of the fluid passage from an outer peripheral edge of the first radial surface toward the outlet side, and an annular inclined surface that inclines toward the valve seat setting surface from the fixing member setting surface may be provided. An outer peripheral surface of the fixing member may include an upstream side surface that contacts the fixing member setting surface and a downstream side surface that contacts the valve seat setting surface closer to the outlet side than the upstream side surface. The upstream side surface may include an annular seal ring fitting groove provided in an intermediate position between an inlet side edge and an outlet side edge thereof, and the seal ring may be set in the seal ring fitting groove so as to be hermetically engaged to the fixing member setting surface.

Thus, damage to the seal ring can be prevented by the annular inclined surface when the seal ring fitted into the seal ring fitting groove is set so as to be hermetically engaged to the fixing member setting surface.

Further, it is preferable that the fixing member includes charged pressure removing means extending from the outer peripheral surface of the fixing member to the fluid passage. The charged pressure removing means are provided to prevent the danger of high-pressure fluid being sealed between the inner peripheral surface of the first tubular member and the valve member and fixing member when, following supply of the high-pressure fluid to the tank, the valve seat member and the fixing member are pushed toward the inlet side by the pressure of the high-pressure fluid supplied to the tank, thereby creating a strong hermetic engagement with the inner peripheral surface of the first tubular member, with the result that the sealed-in high-pressure fluid leaks out little by little over a long period of time following detachment of the pipe coupling member on the high-pressure fluid supply side to cause problems in the pipe coupling member.

The charged pressure removing means may comprise a groove provided in the inlet side end surface of the fixing member abutting against the first radial surface.

Further, a filter may be fixed to the fixing member, and the filter may include a tubular filter part extending from the fixing member to the inlet side through the fluid passage and an end surface filter part set to cover an inlet side end surface of the tubular filter part.

Further, the fixing member may include a through hole for preventing breakage of the seal ring, which extends radially outward from the fixing member in the fluid passage and opens onto the outer peripheral surface of the fixing member in a position closer to a downstream side than the seal ring fitting groove. By providing the through hole, equal pressure to the pressure of the high-pressure fluid acting from the upstream side of the seal ring is applied to the seal ring from the downstream side through the through hole during fluid supply, and as a result, the seal ring is held with stability, thereby ensuring that the seal ring is not damaged.

BRIEF DESCRIPTION OF THE DRAWING

FIG. 1 is a longitudinal sectional side view showing an embodiment of a pipe coupling member for high-pressure fluid according to the present invention.

BEST MODE FOR CARRYING OUT THE INVENTION

An embodiment of a pipe coupling member for high-pressure fluid according to the present invention will be described below on the basis of the attached drawings.

FIG. 1 shows a pipe coupling member for high-pressure fluid 12 according to the present invention. The pipe coupling member for high-pressure fluid is connected to a female pipe coupling member 10 for supplying liquefied hydrogen, a part of which is indicated by dot-dash lines in FIG. 1, in order to receive hydrogen gas.

The pipe coupling member for high-pressure fluid 12 takes an overall tubular shape, and includes a fluid passage 14 extending from an inlet side (a left end opening side in FIG. 1) for receiving the hydrogen gas to an outlet side (a right end opening side) connected to a high-pressure fluid tank (not shown) for storing the received hydrogen gas. More specifically, the pipe coupling member for high-pressure fluid 12 includes, as principal components, a first tubular member 20, a second tubular member 22 that is inserted into and fixed to the first tubular member 20 from an outlet side opening of the first tubular member, a valve seat member 24, a fixing member 26 for fixing the valve seat member 24 between the first and second tubular members 20, 22, and a check valve type valve member 27.

An inner wall surface of the first tubular member 20 includes: a fluid passage surface 25 that extends toward the outlet side from an inlet side and defines an upstream side part of the fluid passage 14; a first radial surface 28 that extends radially outward from an outlet side edge of the fluid passage surface 25; a fixing member setting surface 30 that extends parallel to an axis of the fluid passage 14 from an outer peripheral edge of the first radial surface 28 and contacts an outer peripheral surface of the fixing member 26; a valve seat member setting surface 34 that has a larger diameter than the fixing member setting surface 30 and is connected to the fixing member setting surface 30 through an inclined surface 32; a second radial surface 36 that extends radially outward from an outlet side edge of the valve seat member setting surface 34; a seal ring setting surface 38 comprising a small diameter portion that extends parallel to the axis of the fluid passage from an outer peripheral edge of the second radial surface 36 and a large diameter portion that forms a continuation of the small diameter portion; and a female screw surface 42 that is provided closer to the outlet side than the seal ring setting surface and screwed to a male screw surface 40 of the second tubular member 22.

An outer peripheral surface of a forward end part of the second tubular member 22 has a substantially identical diameter to the seal ring setting surface 38, and the valve seat member 24 and fixing member 26 are sandwiched fixedly between this forward end surface and the first radial surface 28 of the first tubular member 20.

The valve seat member 24 has an overall annular shape, and an outer peripheral surface 44 thereof has an identical diameter to the valve seat member setting surface 34. The valve seat member 24 is set in such a way that an upstream side part thereof contacts the valve seat member setting surface 34 and a downstream side part extends parallel to and at a remove from the seal ring setting surface 38. The valve seat member 24 includes an annular inlet side end surface 46 extending radially inward from an inlet side edge of the outer peripheral surface 44, an annular outlet side end surface 48 extending radially inward from an outlet side end edge of the outer peripheral surface 44, and an inner peripheral surface 50 extending between the inlet side end surface 46 and the outlet side end surface 48. The inner peripheral surface 50 includes an inlet side part extending parallel to the axis of the fluid passage and an outlet side part that flares rearward from the inlet side part and extends to the outlet side end surface 48, and a valve seat surface 52 is formed between the inlet side part and outlet side part.

The fixing member 26 has an overall annular shape and is formed such that substantially all of an outer peripheral surface 56 thereof contacts the fixing member setting surface 30 and an outlet side end portion of the outer peripheral surface is increased in diameter so as to contact the valve seat member setting surface 34. The fixing member 26 has a substantially rectangular cross-section, whereby an inlet side end surface 58 thereof abuts against the first radial surface 28 and an outlet side end surface 60 thereof abuts against the inlet side end surface 46 of the valve seat member 24. The outlet side end surface 60 of the fixing member extends to a radial outer side position beyond an outer peripheral edge of the inlet side end surface 46 of the valve seat member and extends to a radial inner side position beyond an inner peripheral edge of the inlet side end surface 46. Thus, the entire inlet side end surface 46 of the valve seat member abuts against the outlet side end surface 60 of the fixing member.

An annular seal ring fitting groove 64 is formed in an outer peripheral surface of the fixing member 26, and a seal ring 66 fitted into the seal ring fitting groove 64 is hermetically engaged to the fixing member setting surface 30. The fixing member 26 is provided with charged pressure removing means for releasing pressure that may become sealed within a minute gap between the outer peripheral surface of the fixing member and an inner peripheral surface of the first tubular member to the fluid passage, and breakage preventing means for preventing the charged pressure from breaking the seal ring 66. More specifically, in the illustrated example, a groove 68 formed in the inlet side end surface of the fixing member on the inlet side of the seal ring fitting groove 64 and a through hole 70 that penetrates the fixing member radially on the outlet side of the fitting groove 64 are provided. The through hole 70 constitutes breakage preventing means for causing an equal fluid pressure to a fluid pressure acting from the upstream side of the seal ring 66 to act from the downstream side during high-pressure fluid supply such that the seal ring is held with stability and prevented from breaking, and the groove 68 constitutes charged pressure removing means for discharging the fluid pressure quickly to eliminate the danger of fluid remaining in a minute gap between the outer peripheral surface of the fixing member 26 and the fixing member setting surface 30 following fluid supply and leaking out little by little to cause problems in the pipe coupling member.

A seal ring setting space 39 having a rectangular cross-section is defined by the outer peripheral surface of the valve seat member 24, the second radial surface 36, the seal ring setting surface 38, and the forward end surface of the second tubular member 22, and a seal ring 72 is set in the seal ring setting space 39 so as to be hermetically engaged between the outer peripheral surface of the valve seat member 24 and the seal ring setting surface 38. Further, backup rings 74, 76 are set respectively on an inlet side and an outlet side of the seal ring 72 in the seal ring setting space 39. The backup rings are used to prevent the seal ring from penetrating a gap between the mutually contacting surfaces of the first and second tubular members 20, 22 and a gap in a contact surface between the second tubular member 22 and the outer peripheral surface of the valve seat member 24. In the illustrated example, a seal ring 78 and a pair of backup rings 80, 82 are set similarly between the first and second tubular members 20, 22.

A radially penetrating communication hole 84 is provided in the forward end part of the second tubular member 22. More specifically, the communication hole 84 extends from an inner peripheral surface 86 of the second tubular member (in other words, a surface defining a downstream part of the fluid passage 14 of the pipe coupling member for high-pressure fluid 12) to an outer peripheral surface 88 of the second tubular member, which contacts the seal ring setting surface 38 of the first tubular member, so that pressure in the fluid passage can be led into the seal ring setting space 39 through the communication hole 84 and a minute gap formed between the seal ring setting surface 38 of the first tubular member and the outer peripheral surface of the second tubular member 22.

The valve member 27 has an overall tubular shape in which an inlet side end portion 90 is a tapered closed end, and this tapered surface can be engaged to the valve seat surface 52 formed on the inner peripheral surface of the valve seat member 24, as shown in the drawing. Further, a through hole 92 that penetrates a tubular side wall of the valve member 27 is provided in the tubular side wall. The valve member 27 is urged toward the inlet side by a compression spring 94 such that the tapered surface of the inlet side end portion 90 is pressed against and engaged to the valve seat surface 52.

In the illustrated embodiment, a tubular filter 96 is attached to the inlet side of the fixing member 26. More specifically, the filter 96 comprises a tubular filter portion 96-1 extending from the fixing member and a metal tip portion 96-2 provided on a forward end of the tubular filter portion 96-1.

When the pipe coupling member for supplying high-pressure fluid 10 is connected to the pipe coupling member for high-pressure fluid 12 and high-pressure fluid is supplied from the pipe coupling member 10, the valve member 27 moves against an urging force of the compression spring 94 so as to separate from the valve seat surface, thereby opening the fluid passage and allowing the fluid to be supplied.

When the valve member 27 remains closed at the very beginning of high-pressure fluid supply, the pressure in the fluid passage 14 is higher on the upstream side of the valve member 27, and this pressure is applied to the seal ring setting space 39 via an abutting surface between the valve seat member 24 and fixing member 26 and a contact surface between the valve seat member 24 and valve seat member setting surface 34. As a result, the seal ring 72 and the backup rings 74, 76 are forced toward the outlet side and thereby deformed. At this time, gaps may be formed between the outlet side backup ring 76 and the seal ring setting surface and between the outlet side backup ring 76 and the outer peripheral surface of the valve seat member 24, and the seal ring 72 may be forced into these gaps.

In the present invention, however, the communication hole 84 is provided in the forward end part of the second tubular member, and therefore the pressure of the high-pressure fluid that reaches the downstream side of the subsequently opened valve seat surface is applied to the seal ring setting space 39 through a gap between the forward end part outer peripheral surface of the second tubular member 22 and the seal ring setting surface 38 in addition to the gap between the valve seat member 24 and the forward end surface of the second tubular member 22 such that even when the seal ring is forced into the gap in the manner described above, the penetration can be corrected. For this reason, when the valve member is closed and the supply side pipe coupling member is detached, the seal ring 72 remains in an appropriate condition and can carry out a sealing function. As a result, the high-pressure fluid can be prevented from leaking through the seal ring setting space 39 to the upstream side of the fluid passage.

An embodiment of the present invention was described above, but the present invention is not limited to this embodiment. For example, the pipe coupling member for high-pressure fluid according to the present invention is described as a male pipe coupling member but may comprise a female pipe coupling member.

The invention claimed is:

1. A pipe coupling member for high-pressure fluid, comprising:
   a tubular high-pressure fluid pipe coupling body including a fluid passage that extends from an inlet side for receiving a high-pressure fluid to an outlet side connected to a high-pressure fluid tank for storing the received high-pressure fluid, and a valve seat provided on a wall surface of the fluid passage so as to surround the fluid passage; and
   a valve member that is set in the fluid passage and engaged with/disengaged from the valve seat in order to open and close the fluid passage,
   wherein the high-pressure fluid pipe coupling body includes a first tubular member and a second tubular member that is inserted into and fixed to the first tubular member from the outlet side of the first tubular member,
   wherein an inner peripheral surface of the first tubular member includes a fluid passage defining surface that extends from the inlet side toward the outlet side so as to define an upstream part of the fluid passage, a first radial surface that extends radially outward from an outlet side edge of the fluid passage defining surface, a valve seat setting surface that is located closer to the outlet side than the first radial surface and has a larger diameter than an outer peripheral edge of the first radial surface and extends parallel to an axis of the fluid passage, a second radial surface that extends radially outward from an outlet side edge of the valve seat setting surface, and a seal ring setting surface that extends parallel to the axis of the fluid passage from an outer peripheral edge of the second radial surface,
   wherein the pipe coupling member for high-pressure fluid further comprises a valve seat member comprising a tubular outer peripheral surface including an upstream side part that is engaged to the valve seat setting surface and a downstream side part that extends parallel to the seal ring setting surface, an annular inlet side end surface that extends radially inward from an inlet side end edge of the outer peripheral surface, an annular outlet side end surface that extends radially inward from an outlet side end edge of the outer peripheral surface, and a tubular inner peripheral surface that extends between the inlet side end surface and the outlet side end surface, wherein the second tubular member includes a forward end part having an outer peripheral surface that is inserted into the first tubular member so as to contact the seal ring setting surface thereof, a forward end surface of the forward end part abutting against the outlet side end surface of the valve seat member such that the valve seat member is held between the forward end surface of the forward end part and the first radial surface of the first tubular member, wherein a tubular seal ring setting space is defined by the forward end surface of the second tubular member, the seal ring setting surface, the second radial surface, and the outer peripheral surface of the valve seat member, and a seal ring is set in the seal ring setting space so as to be hermetically engaged to the outer peripheral surface of the valve seat member and the seal ring setting surface, and, wherein the valve member is engaged to the valve seat member to close the fluid passage, and the forward end part of the second tubular member includes a communication hole that penetrates the forward end part radially from an inner peripheral surface of the second tubular member, which defines a downstream part of the fluid passage, to the outer peripheral surface of the forward end part, which contacts the seal ring setting surface of the first tubular member.

2. The pipe coupling member for high-pressure fluid according to claim 1, further comprising backup rings set on inlet and outlet sides of the seal ring in the seal ring setting space and set between the outer peripheral surface of the valve seat member and the seal ring setting surface.

3. The pipe coupling member for high-pressure fluid according to claim 1, further comprising a tubular fixing member set between the valve seat member and the first radial surface in an axial direction of the fluid passage, wherein the valve seat member is fixedly engaged between the first radial surface and the forward end surface of the second tubular member through the fixing member.

4. The pipe coupling member for high-pressure fluid according to claim 3, wherein an outlet side end surface of the fixing member, which contacts the valve seat member, extends from a position contacting the seal ring setting surface and abutting against an outer peripheral edge of the inlet side end surface of the valve seat member to a radial inner side position beyond an inner peripheral edge of the inlet side end surface, thereby abutting against the entirety of the inlet side end surface of the valve seat member.

5. The pipe coupling member for high-pressure fluid according to claim 4, wherein the first radial surface has a smaller diameter than the valve seat setting surface, wherein the first tubular member further comprising a fixing member setting surface into which the fixing member is fitted and which extends parallel to the axis of the fluid passage from an outer peripheral edge of the first radial surface toward the outlet side, and an annular inclined surface that inclines toward the valve seat setting surface from the fixing member setting surface, and wherein an outer peripheral surface of the fixing member includes an upstream side surface that contacts the fixing member setting surface and a downstream side surface that contacts the valve seat setting surface closer to the outlet side than the upstream side surface, wherein the upstream side surface includes an annular seal ring fitting groove provided in an intermediate position between an inlet side edge and an outlet side edge thereof, and the seal ring is set in the seal ring fitting groove so as to be hermetically engaged to the fixing member setting surface.

6. The pipe coupling member for high-pressure fluid according to claim 5, wherein the fixing member includes charged pressure removing means extending from the outer peripheral surface of the fixing member to the fluid passage.

7. The pipe coupling member for high-pressure fluid according to claim 6, wherein the charged pressure removing means comprises a groove provided in the inlet side end portion surface of the fixing member, which abuts against the first radial surface.

8. The pipe coupling member for high-pressure fluid according to claim 3, further comprising a filter fixed to the fixing member, the filter including a tubular filter part extending through the fluid passage toward the inlet side and an end surface filter part set to cover an inlet side end surface of the tubular filter part.

9. The pipe coupling member for high-pressure fluid according to claim 5, wherein the fixing member includes a through hole for preventing breakage of the seal ring, which extends radially outward from the fluid passage of the fixing member and opens onto the outer peripheral surface of the fixing member in a position closer to a downstream side than the seal ring fitting groove.

* * * * *